(12) United States Patent
Horii et al.

(10) Patent No.: US 12,047,192 B2
(45) Date of Patent: Jul. 23, 2024

(54) CONTROL DEVICE, COMPUTER-READABLE RECORDING MEDIUM RECORDING A PROGRAM, AND CONTROL METHOD

(71) Applicant: Panasonic Intellectual Property Corporation of America, Torrance, CA (US)

(72) Inventors: Noriaki Horii, Kyoto (JP); Tatsumi Nagashima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/368,252

(22) Filed: Sep. 14, 2023

(65) Prior Publication Data
US 2024/0007320 A1  Jan. 4, 2024

Related U.S. Application Data

(63) Continuation of application No. PCT/JP2022/002430, filed on Jan. 24, 2022.

(30) Foreign Application Priority Data

Mar. 19, 2021  (JP) .................................. 2021-045731
Mar. 19, 2021  (JP) .................................. 2021-045732

(51) Int. Cl.
  *H04L 12/28*  (2006.01)
(52) U.S. Cl.
  CPC ........ *H04L 12/2809* (2013.01); *H04L 12/282* (2013.01); *H04L 2012/285* (2013.01)

(58) Field of Classification Search
  CPC ............... H04L 12/2809; H04L 12/282; H04L 2012/285
  See application file for complete search history.

(56) References Cited

U.S. PATENT DOCUMENTS

2015/0033136 A1  1/2015  Sasaki et al.
2019/0171171 A1*  6/2019  Verteletskyi ......... G01C 21/206
(Continued)

FOREIGN PATENT DOCUMENTS

WO  2014/128801  8/2014

OTHER PUBLICATIONS

International Search Report issued in International Pat. Appl. No. PCT/JP2022/002430, dated Mar. 29, 2022, along with an English translation thereof.

*Primary Examiner* — Normin Abedin
(74) *Attorney, Agent, or Firm* — GREENBLUM & BERNSTEIN, P.L.C.

(57) ABSTRACT

A control device causes, when being adapted to a gateway, a space creating part to create a second space by combining two or more first spaces on the basis of position information acquired by an acquiring part, a device control part to generate relevance information indicative of a relevance between identification information of the second space and identification information of two or more devices included in the second space among the devices, and a notification part to notify, on the basis of the relevance information generated by the device control part, at least one of collective control information for collectively controlling the two or more devices included in the second space and individual control information for individually controlling the two or more devices included in the second space.

11 Claims, 17 Drawing Sheets

(56) References Cited

U.S. PATENT DOCUMENTS

2019/0209022 A1* 7/2019 Sobol ................. A61B 5/02055
2021/0325189 A1* 10/2021 Faustino .............. G01C 21/206

* cited by examiner

FIG.8                   601

| ROOM ID | ROOM NAME | DEVICE ID | DEVICE NAME |
|---|---|---|---|
| R1 | LIVING ROOM | A01 | AIR CONDITIONER |
| R1 | LIVING ROOM | A02 | MAIN LAMP |
| R1 | LIVING ROOM | A03 | INDIRECT LAMP |
| R1 | LIVING ROOM | A04 | TV |
| R2 | DINING ROOM | A05 | MAIN LAMP |
| R2 | DINING ROOM | A06 | INDIRECT LAMP |
| R2 | DINING ROOM | A07 | AIR CONDITIONER |
| R3 | KITCHEN | A08 | LAMP |
| R3 | KITCHEN | A09 | VENTILATOR |

CONTROL DEVICE, COMPUTER-READABLE RECORDING MEDIUM RECORDING A PROGRAM, AND CONTROL METHOD

TECHNICAL FIELD

The present disclosure relates to a control device, a computer-readable recording medium recording a program, and a control method.

BACKGROUND ART

Patent Literature 1 discloses a home controller for controlling switch-on and switch-off of a plurality of devices disposed in a plurality of rooms of a house.

The home controller disclosed in Patent Literature 1 manages the devices by a room unit of the house.

However, there is a case that a plurality of rooms is used as a single activity space, e.g., a living-dining-kitchen, depending on a lifestyle of a resident in a house. In this case, it is more practical for the resident to manage the devices disposed in the house by an activity space unit than by a room unit.

In this regard, a home controller positioned in the vicinity of a gateway of an activity space is expected to overall display devices included in the activity space to allow for collectively or individually controlling the devices.

CITATION LIST

Patent Literature

Patent Literature 1: International Unexamined Patent Publication WO 2014/128801

SUMMARY OF INVENTION

An object of the present disclosure is to provide a control device, a computer-readable recording medium recording a program, and a control method that enable an execution of an optimum device control according to a position of a control device.

Means for Solving the Problems

A control device for controlling a plurality of devices disposed in a building having a plurality of first spaces according to an aspect of the present disclosure includes: an acquiring part for acquiring disposition information and position information; a space creating part; a device control part; and a notification part, wherein the disposition information includes a relevance between identification information of each of the first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, the space creating part creates a second space by combining the two or more first spaces on the basis of the position information acquired by the acquiring part, the device control part generates relevance information indicative of a relevance between identification information of the second space and identification information of two or more devices included in the second space among the devices, and the notification part notifies, on the basis of the relevance information generated by the device control part, at least one of collective control information for collectively controlling the two or more devices included in the second space and individual control information for individually controlling the two or more devices included in the second space.

BRIEF DESCRIPTION OF DRAWINGS

FIG. 8 is an illustration briefly showing an example of disposition information.

DESCRIPTION OF EMBODIMENTS

Underlying Findings for Present Disclosure

Figure 1:
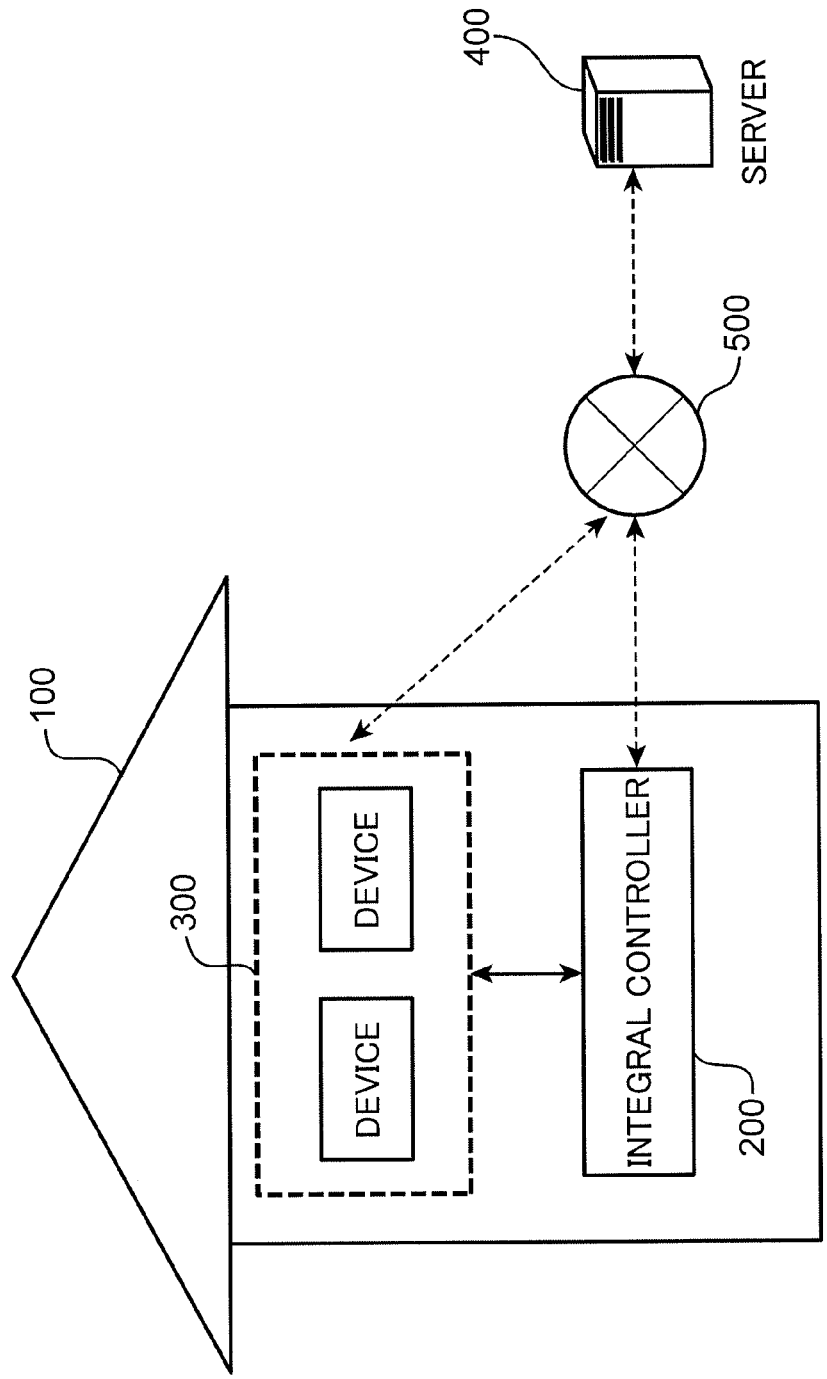
FIG. 1 is a diagram showing a whole structure of a home control system according to an embodiment of the present disclosure.

In a smart home with IoT technology, a control device (home controller) for integrally controlling a plurality of devices disposed in a plurality of rooms of a house may be used. For example, Patent Literature 1 discloses a home controller for controlling switch-on and switch-off of a plurality of devices disposed in a plurality of rooms of a house. The home controller manages the devices by a room unit of the house.

However, there is a case that a plurality of rooms is used as a single activity space, e.g., a living-dining-kitchen depending on a lifestyle of a resident in a house. In this case, it is more practical for the resident to manage the devices disposed in the house by an activity space unit than by a room unit.

In this regard, in a case that a plurality of home controllers is positioned in the activity space, a home controller positioned in the vicinity of a gateway of the activity space is expected to overall display the devices included in the activity space to allow for collectively or individually controlling the devices; and a home controller positioned far away from the gateway of the activity space is expected to allow for controlling only the devices that are disposed around the home controller. The resident might perform a manual setting for this case, but the setting is complicated; thus, means enabling an automatic setting has been expected to be achieved.

To solve the above-mentioned problem, the present inventors found that a setting of management units of a plurality of devices based on disposition information of the devices and position information of a control device including gateway-adaptation information enables an optimal setting of the management units of the devices for a position of the control device, thus achieving the present disclosure.

Next, embodiments of the present disclosure will be described.

A control device for controlling a plurality of devices disposed in a building having a plurality of first spaces according to an aspect of the present disclosure includes: an acquiring part for acquiring disposition information and position information; a space creating part; a device control part; and a notification part, wherein the disposition information includes a relevance between identification information of each of the first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, the space creating part creates a second space by combining the two or more first spaces on the basis of the position information acquired by the acquiring part, the device control part generates relevance information indicative of a relevance between identification information of the second space and identification information of two or more devices included in the second space among the devices, and the notification part notifies, on the basis of the relevance information generated by the device control part, collective control information for collectively controlling the two or more devices included in the second space.

In this configuration, when the control device is adapted to the gateway, the notification part notifies collective control information for collectively controlling the two or more devices included in the second space. Accordingly, a control device positioned in the vicinity of the gateway allows a user to collectively control two or more devices included in the second space, improving usability for a user.

In the configuration above, when the control device is not adapted to the gateway, the device control part generates relevance information indicative of a relevance between identification information of the specific first space and identification information of two or more devices included in the specific first space among the devices, and the notification part notifies, on the basis of the relevance information generated by the device control part, collective control information for collectively controlling the two or more devices included in the specific first space.

In this configuration, when the control device is not adapted to the gateway, the notification part notifies collective control information for collectively controlling the two or more devices included in the specific first space. Accordingly, a control device positioned far away from the gateway allows a user to control only the devices that are included in the specific first space where the control device is positioned, improving usability for a user.

In the configuration above, there may be provided a detection part for detecting, in the second space, another person other than an operating person of the control device, wherein when the detection part detects the another person, the device control part generates relevance information indicative of a relevance between identification information of the specific first space and identification information of two or more devices included in the specific first space among the devices, and the notification part notifies, on the basis of the relevance information generated by the device control part, control information for controlling the two or more devices included in the specific first space.

In this configuration, when the detection part detects the another person, the notification part notifies control information for controlling the two or more devices included in the specific first space. Accordingly, in a case that another person other than a user is present in the second space, the control device allows, the user to control only the devices that are included in the specific first space where the control device is positioned, improving usability for a user.

In the configuration above, when the current time is not within a predetermined time zone, the device control part generates relevance information indicative of a relevance between identification information of the specific first space and identification information of two or more devices included in the specific first space among the devices, and the notification part notifies, on the basis of the relevance information generated by the device control part, control information for controlling the two or more devices included in the specific first space.

In this configuration, when the current time is not within the predetermined time zone, the notification part notifies control information for controlling the two or more devices included in the specific first space. Accordingly, since a time period during which a resident frequently enters and leaves a space is set as the predetermined time zone, when the current time is not within the predetermined time zone, the control device allows the user to control only the devices that are included in the specific first space where the control device is positioned. This improves usability for a user.

In the configuration above, the notification part has a display part, the display part displays the identification information of the new space, identification information of each of the two or more devices included in the new space, and an icon serving as the collective control information for collectively controlling the two or more devices.

In this configuration, the display part displays identification information (e.g., space name) of the second space, identification information (e.g., device name) of the two or more devices included in the second space, and an icon for collectively controlling the two or more devices. This provides a user interface easy for a user to understand and control.

In the configuration above, the notification part further notifies, on the basis of the relevance information, individual control information for individually controlling the two or more devices included in the second space.

In this configuration, individual control information for individually controlling the two or more devices included in the second space is notified in addition to the collective control information. This further improves usability for a user.

In the configuration above, the second space includes at least two of a living room, a dining room, and a kitchen.

In this configuration, an installation of the control device according to the aspect in a house having a layout of no wall partition between the living room, the dining room, and the kitchen increases the advantage of the installation of the control device.

A computer-readable recording medium recording a program according to an aspect of the present disclosure causes a computer included in a control device for controlling a plurality of devices disposed in a building having a plurality of first spaces to serve as: acquiring means for acquiring disposition information and position information; space creating means; device control means; and output means, wherein the disposition information includes a relevance between identification information of each of the first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, the space creating means creates a second space by combining the two or more first spaces on the basis of the position information acquired by the acquiring means, the device control means generates relevance information indicative of a relevance between identification information of the second space and identification information of two or more devices included in the second space among the devices, and the output means outputs the relevance information to a notification part for notifying, on the basis of the relevance information generated by the device control part, collective control information for collectively controlling the two or more devices included in the second space.

In this configuration, when the control device is adapted to the gateway, the notification part notifies collective control information for collectively controlling the two or more devices included in the second space. Accordingly, a control device positioned in the vicinity of the gateway allows a user to collectively control two or more devices included in the second space, improving usability for a user.

A control method for controlling a plurality of devices disposed in a building having a plurality of first spaces according to an aspect of the present disclosure includes: by a computer, acquiring disposition information and position information; the disposition information includes a relevance between identification information of each of first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, creating a second space by combining the two or more first spaces on the basis of the acquired position information; generating relevance information indicative of a relevance between identification information of the second space and identification information of two or more devices included in the second space among the devices; and outputting the relevance information to a notification part for notifying, on the basis of the relevance information, collective control information for collectively controlling the two or more devices included in the second space.

In this configuration, when the control device is adapted to the gateway, the notification part notifies collective control information for collectively controlling the two or more devices included in the second space. Accordingly, a control device positioned in the vicinity of the gateway allows a user to collectively control two or more devices included in the second space, improving usability for a user.

A control device for controlling a plurality of devices disposed in a building having a plurality of first spaces according to an aspect of the present disclosure includes: an acquiring part for acquiring disposition information and position information; a space creating part; a device control part; and a notification part, wherein the disposition information includes a relevance between identification information of each of the first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, the space creating part creates a second space by combining the two or more first spaces on the basis of the position information acquired by the acquiring part, the device control part generates relevance information indicative of a relevance between identification information of the second space and identification information of two or more devices included in the second space among the devices, and the notification part notifies, on the basis of the relevance information generated by the device control part, individual control information for individually controlling the two or more devices included in the second space.

In this configuration, when the control device is adapted to the gateway, the notification part notifies individual control information for individually controlling the two or more devices included in the second space. Accordingly, a control device positioned in the vicinity of the gateway allows a user to individually control two or more devices included in the second space, improving usability for a user.

In the configuration above, when the control device is not adapted to the gateway, the device control part generates relevance information indicative of a relevance between identification information of the specific first space and identification information of two or more devices included in the specific first space among the devices, and the notification part notifies, on the basis of the relevance information generated by the device control part, individual control information for individually controlling the two or more devices included in the specific first space.

In this configuration, when the control device is not adapted to the gateway, the notification part notifies individual control information for individually controlling the two or more devices included in the specific first space. Accordingly, a control device positioned far away from the gateway allows a user to control only the devices that are included in the specific first space where the control device is positioned, improving usability for a user.

In the configuration above, there may be provided a detection part for detecting, in the second space, another person other than an operating person of the control device, wherein when the detection part detects the another person, the device control part generates relevance information indicative of a relevance between identification information of the specific first space and identification information of two or more devices included in the specific first space among the devices, and the notification part notifies, on the basis of the relevance information generated by the device control part, control information for controlling the two or more devices included in the specific first space.

In this configuration, when the detection part detects the another person, the notification part notifies control information for controlling the two or more devices included in the specific first space. Accordingly, in a case that another person other than a user is present in the second space, the control device allows the user to control only the devices that are included in the specific first space where the control device is positioned, improving usability for a user.

In the configuration above, when the current time is not within a predetermined time zone, the device control part generates relevance information indicative of a relevance between identification information of the specific first space and identification information of two or more devices included in the specific first space among the devices, and the notification part notifies, on the basis of the relevance information generated by the device control part, control information for controlling the two or more devices included in the specific first space.

In this configuration, when the current time is not within the predetermined time zone, the notification part notifies control information for controlling the two or more devices included in the specific first space. Accordingly, since a time period during which a resident frequently enters and leaves a space is set as the predetermined time zone, when the current time is not within the predetermined time zone, the control device allows the user to control only the devices that are included in the specific first space where the control device is positioned. This improves usability for a user.

In the configuration above, the notification part has a display part, the display part displays the identification information of the second space, identification information of each of the two or more devices included in the second space, and an icon serving as the individual control information for individually controlling the two or more devices.

In this configuration, the display part displays identification information (e.g., space name) of the second space, identification information (e.g., device name) of the two or more devices included in the second space, and an icon for individually controlling the two or more devices. This provides a user interface easy for a user to understand and control.

In the configuration above, the second space includes at least two of a living room, a dining room, and a kitchen.

In this configuration, an installation of the control device according to the aspect in a house having a layout of no wall partition between the living room, the dining room, and the kitchen increases the advantage of the installation of the control device.

A computer-readable recording medium recording a program according to an aspect of the present disclosure causes a computer included in a control device for controlling a plurality of devices disposed in a building having a plurality of first spaces to serve as: acquiring means for acquiring disposition information and position information; space creating means; device control means; and output means, wherein the disposition information includes a relevance between identification information of each of the first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, the space creating means creates a second space by combining the two or more first spaces on the basis of the position information acquired by the acquiring means, the device control means generates relevance information indicative of a relevance between identification information of the second space and identification information of two or more devices included in the second space among the devices, and the output means outputs the relevance information to a notification part for notifying, on the basis of the relevance information generated by the device control part, individual control information for individually controlling the two or more devices included in the second space.

In this configuration, when the control device is adapted to the gateway, the notification part notifies individual control information for individually controlling the two or more devices included in the second space. Accordingly, a control device positioned in the vicinity of the gateway allows a user to individually control two or more devices included in the second space, improving usability for a user.

A control method for controlling a plurality of devices disposed in a building having a plurality of first spaces according to an aspect of the present disclosure includes: by a computer, acquiring disposition information and position information; the disposition information includes a relevance between identification information of each of first spaces and identification information of a device disposed in each first space among the devices, and the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway, when the control device is adapted to the gateway, by a computer, creating a second space by combining the two or more first spaces on the basis of the acquired position information; generating relevance information indicative of a relevance between identification information of the second space and identification information of two or more devices included in the second space among the devices; and outputting the relevance information to a notification part for notifying, on the basis of the relevance information, individual control information for individually controlling the two or more devices included in the second space.

In this configuration, when the control device is adapted to the gateway, the notification part notifies individual control information for individually controlling the two or more devices included in the second space. Accordingly, a control device positioned in the vicinity of the gateway allows a user to individually control two or more devices included in the second space, improving usability for a user.

This disclosure can be realized as: a program for causing a computer to execute each distinctive feature included in such a system; or a system operated by the program. Additionally, it goes without saying that the program is distributable as a non-transitory computer readable storage medium like a CD-ROM, or distributable via a communication network like the Internet.

Embodiments of Present Disclosure

Embodiments of the present disclosure will be described below with reference to the drawings. The elements given the same reference numerals in different drawings are defined to be the same or like elements. Constituent elements, dispositions thereof, connections between them, and the order of operations described below are mere examples, and thus should not be construed to delimit the disclosure. Only the claims delimit the present disclosure. Hence, constituent elements which are not recited in the independent claims each showing the broadest concept among the constituent elements in the embodiments are described as being ones not necessarily required to accomplish the object of the present disclosure but required to achieve preferable configurations.

FIG. 1 is a diagram showing a whole structure of a home control system according to an embodiment of the present disclosure. The home control system includes a smart home 100, a communication network 500, and a server 400. Only one smart home 100 is shown in FIG. 1 for a brief explanation, but a plurality of smart homes may be included.

The smart home 100 has a plurality of spaces (e.g., a room, a bathroom, a toilet, an entrance, a corridor) in which a plurality of devices 300, which are the control target, is disposed. The smart home 100 includes an integral controller 200 for controlling operations of the devices 300. The integral controller 200 can perform mutual data communication with each of the devices 300 through a communication network such as a wireless LAN or a public network.

The server 400 is a control device adapted for managing and controlling the whole home control system. The communication network 500 is, for example, a public network. The communication network 500 is connected with the server 400, the integral controller 200, and the devices 300, which thus enables the server 400 to perform mutual data communication with the integral controller 200 and the devices 300 through the communication network 500.

Figure 2:
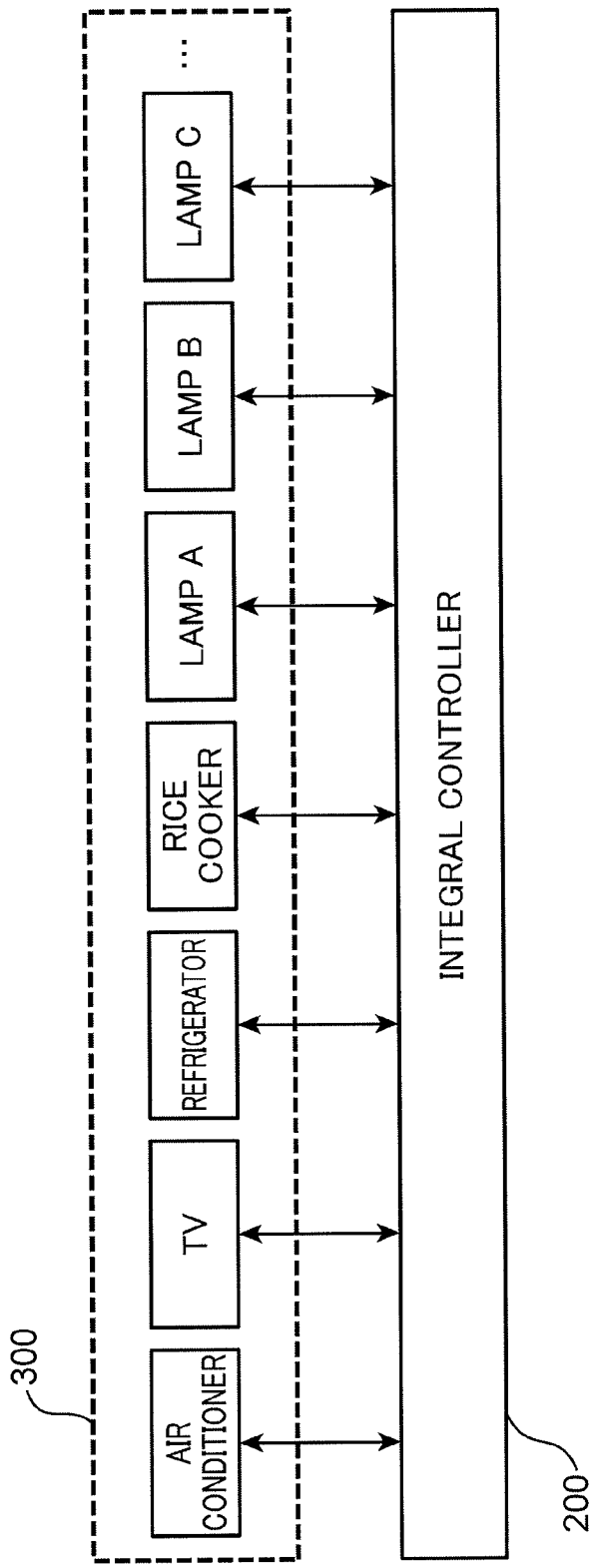
FIG. 2 is an illustration showing specific devices.

FIG. 2 is an illustration showing specific devices 300. As shown therein, the devices 300 are IoT devices, e.g., an air conditioner, a TV, a refrigerator, a rice cooker, and a lamp. Each device 300 is connected with the integral controller 200 through the communication network.

Figure 3:
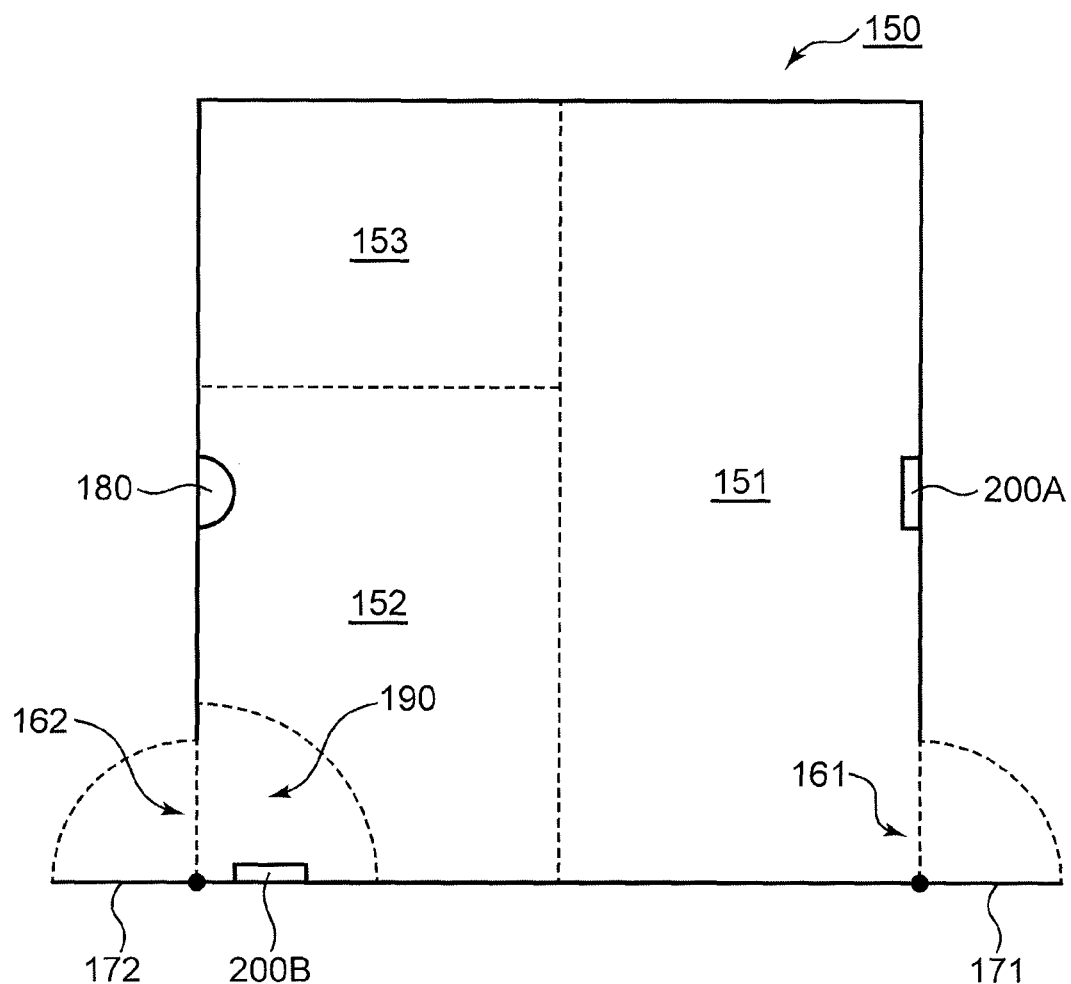
FIG. 3 is an illustration showing a layout in a smart home.

FIG. 3 is an illustration showing a layout of a living room 151, a dining room 152, and a kitchen 153 in a smart home 100. In this layout, the living room 151, the dining room 152, and the kitchen 153 have no wall partition between them and these rooms can be used as an activity space of a living-dining-kitchen (LDK) 150.

The living room 151 has a gateway 161 with a door 171, and the dining room 152 has a gateway 162 with a door 172. The living room 151 is provided with an integral controller 200A, and the dining room 152 is provided with an integral controller 200B. The integral controller 200A is positioned far away from the gateways 161 and 162, and the integral controller 200B is positioned in an adjacent area 190 to the gateway 162. The adjacent area 190 is where a user that enters and leaves the dining room 152 through the gateway 162 can operate the integral controller 200B.

The dining room 152 is provided with a camera 180 for detecting a person present in LDK 150. The camera 180 is configured to exclude the adjacent area 190 of the gateway 162 from the target region of the detection thereby. Thus, the camera 180 serves as a detection part for detecting another person other than an operating person of the integral controller 200B in LDK 150. The detection part may include a human detection sensor instead of the camera 180.

Figure 4:
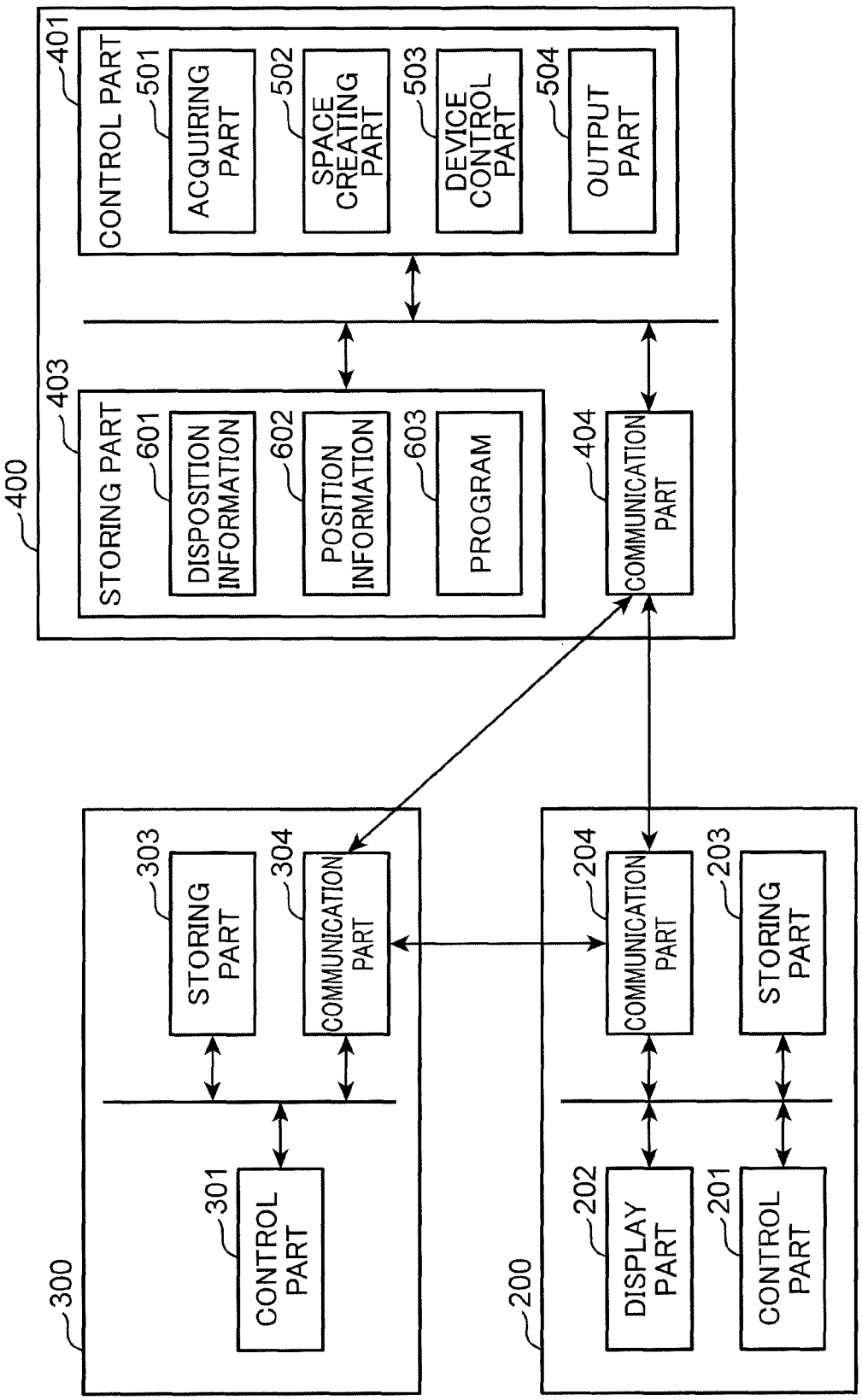
FIG. 4 is a diagram showing a first exemplary configuration of the system.

FIG. 4 is a diagram showing a first exemplary configuration of the system. The home control system includes an integral controller 200, devices 300, and a server 400 (control device).

Each device 300 includes a control part 301, a storing part 303, and a communication part 304. The control part 301 does performance when a CPU executes a certain program. The storing part 303 includes, for example, a flash memory. The communication part 304 includes a communication module compatible with a communication system such as an IP.

The integral controller 200 includes a control part 201, a display part 202, a storing part 203, and a communication part 204. The control part 201 does performance when a CPU executes a certain program. The display part 202 is, for example, a liquid-crystal or organic EL touchscreen display. The storing part 203 includes, for example, an HDD, an SSD, or a flash memory. The communication part 304 includes a communication module compatible with a communication system such as an IP.

The server 400 includes a control part 401, a storing part 403, and a communication part 404. The storing part 403 includes, for example, an HDD, an SSD, or a flash memory. The storing part 403 stores disposition information 601, position information 602, and a program 603. The control part 401 includes an acquiring part 501, a space creating part 502, a device control part 503, and an output part 504, which are established by causing a CPU to execute the program 603 read in a ROM or a RAM from the storing part 403. The functions of these parts will be described later. The communication part 404 includes a communication module compatible with a communication system such as an IP.

Figure 5:
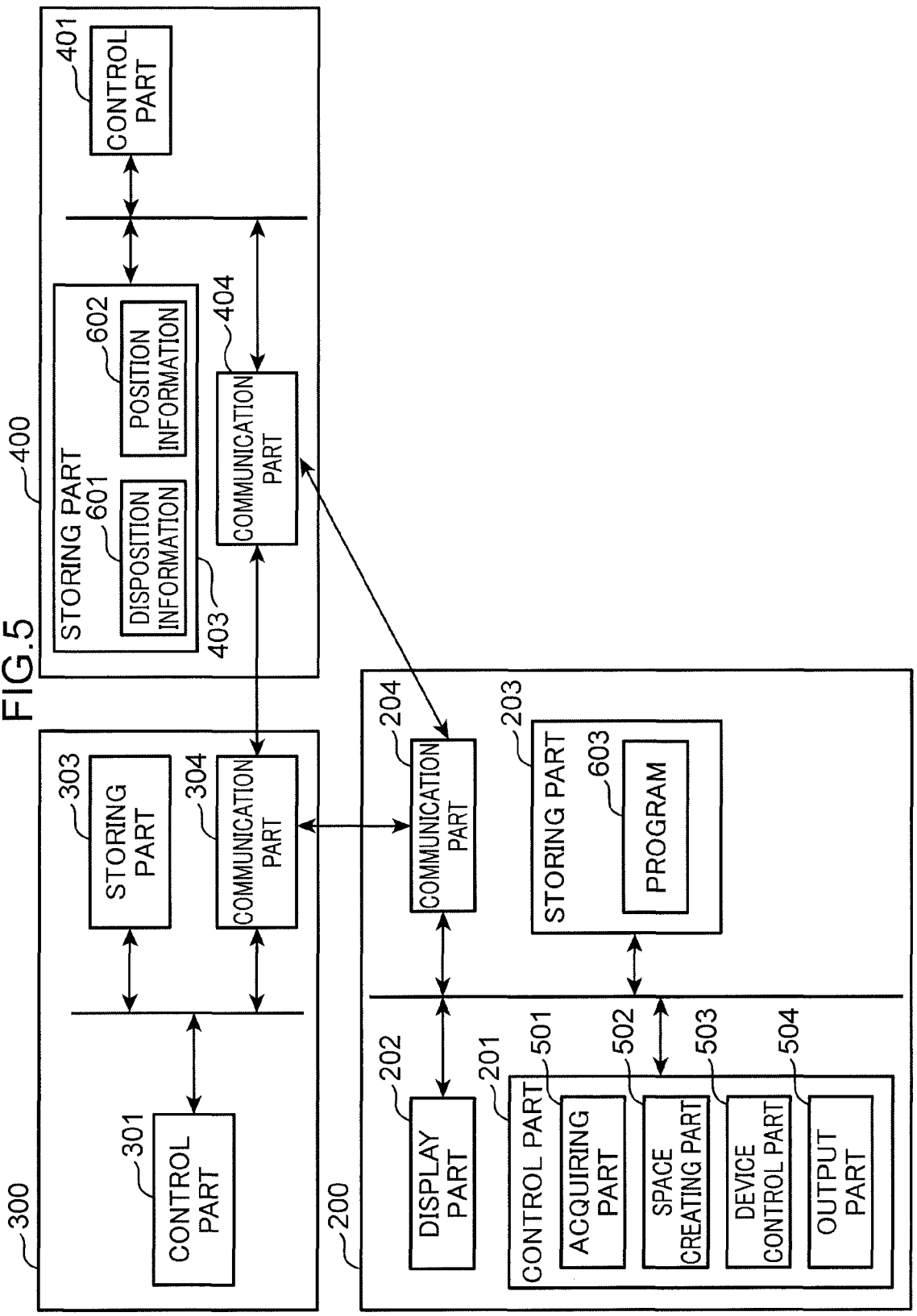
FIG. 5 is a diagram showing a second exemplary configuration of the system.

FIG. 5 is a diagram showing a second exemplary configuration of the system. The home control system includes an integral controller 200 (control device), devices 300, and a server 400.

The integral controller 200 includes a control part 201, a display part 202, a storing part 203, and a communication part 204. The storing part 203 stores a program 603. The control part 201 includes an acquiring part 501, a space creating part 502, a device control part 503, and an output part 504, which are established by causing a CPU to execute the program 603 read in a ROM or a RAM from the storing part 203.

The server 400 includes a control part 401, a storing part 403, and a communication part 404. The storing part 403 stores disposition information 601 and position information 602.

Figure 6:
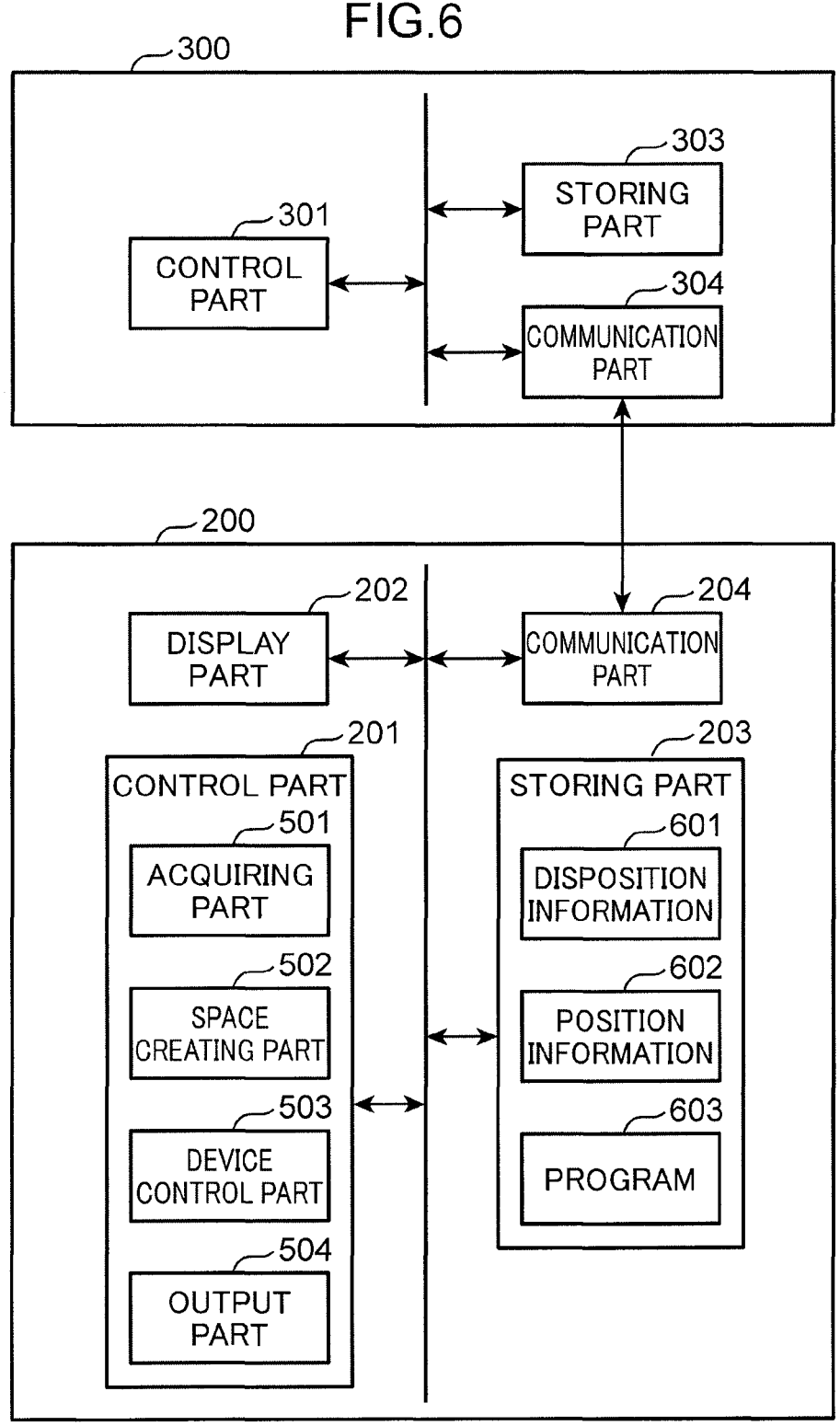
FIG. 6 is a diagram showing a third exemplary configuration of the system.

FIG. 6 is a diagram showing a third exemplary configuration of the system. The home control system includes an integral controller 200 (control device) and devices 300.

The integral controller 200 includes a control part 201, a display part 202, a storing part 203, and a communication part 204. The storing part 203 stores disposition information 601, position information 602, and a program 603. The control part 201 includes an acquiring part 501, a space creating part 502, a device control part 503, and an output part 504, which are established by causing a CPU to execute the program 603 read in a ROM or a RAM from the storing part 203.

The following description will be made about the case of the configuration of the system shown in FIG. 4.

Figure 7:
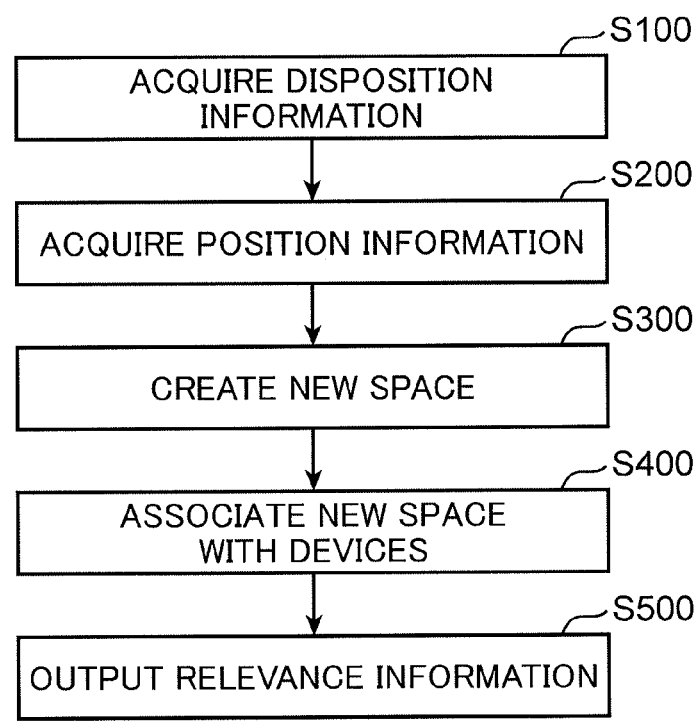
FIG. 7 is a flowchart showing steps of a process executed by a control part.

FIG. 7 is a flowchart showing steps of a process executed by the control part 401 of the server 400. The control part 401 generates relevance information, which will be described later, by executing a process below at the time of: the installation of the system; or a change for a device 300 such as addition, removal, or exchange thereof.

First, the acquiring part 501 acquires disposition information 601 in Step S100 by reading the disposition information 601 from the storing part 403.

FIG. 8 is an illustration briefly showing an example of the disposition information 601. In the case that there is a plurality of smart homes which are the control target, the disposition information 601 is created for each smart home 100. The disposition information 601 is created by an operator of a management company when the system is installed in the smart home 100, or alternatively may be created by a resident of the smart home 100 instead of the operator; and may be created after the installation of the system instead of the timing of the installation thereof.

The disposition information 601 includes a relevance between: identification information (room ID and room name) of each of a plurality of rooms of the smart home 100; and identification information (device ID and device name) of each device 300 disposed in each room. In the example, in the living room (room ID: R1), an air conditioner (device ID: A01), a main lamp (device ID: A02), an indirect lamp (device ID: A03), and a TV (device ID: A04) are disposed. In the dining room (room ID: R2), a main lamp (device ID: A05), an indirect lamp (device ID: A06), and an air conditioner (device ID: A07) are disposed. In the kitchen (room ID: R3), a lamp (device ID: A08) and a ventilator (device ID: A09) are disposed. The management target is not limited to a chamber (space defined by walls), and may include a space (e.g., entrance, stairway, or corridor) not defined by walls. For example, in a case that the integral controller 200 is positioned by a stairway, the resident of the smart home 100 can control the devices 300 disposed in each floor using the integral controller 200 when ascending or descending the stairway.

With reference to FIG. 7, the acquiring part 501 then acquires position information 602 in Step S200 by reading the position information 602 from the storing part 403.

Figure 9:
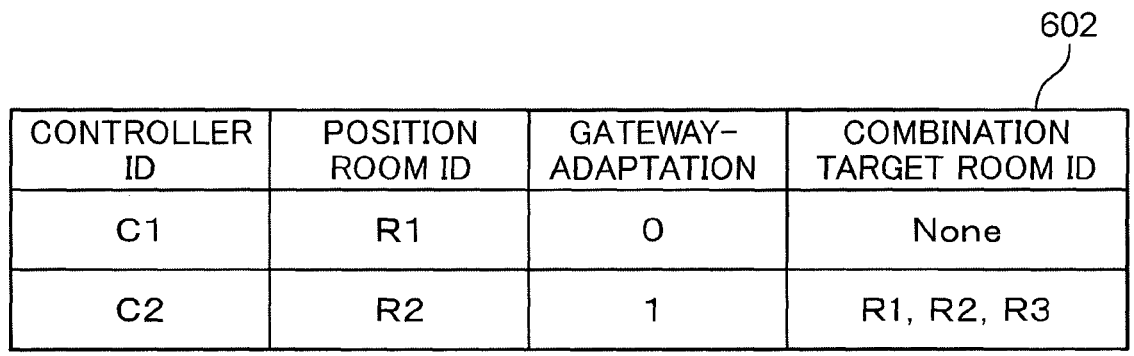
FIG. 9 is an illustration briefly showing an example of position information.

FIG. 9 is an illustration briefly showing an example of the position information 602. The position information 602 is created by an operator of a management company when the system is installed in the smart home 100, or alternatively may be created by a resident of the smart home 100 instead of the operator; and may be created after the installation of the system instead of the timing of the installation thereof.

The position information 602 includes a relevance between identification information (controller ID) of the integral controller 200, identification information (position room ID) of a room where the integral controller 200 is positioned, gateway-adaptation information indicative of whether the integral controller 200 is adapted to a gateway, and identification information (combination target room ID) of two or more rooms to be combined by the integral controller 200 that is adapted to the gateway.

Settings for an integral controller 200A that is positioned far away from the gateways 161 and 162 are as follows: the controller ID given C1, the position room ID given R1, the gateway-adaptation given 0, and the combination target room ID given None. Settings for an integral controller 200B that is positioned in the vicinity of the gateway 162 are as follows: the controller ID given C2, the position room ID given R2, the gateway-adaptation given 1, and the combination target room ID given R1, R2, and R3. The gateway-adaption given 0 means that the integral controller is not adapted to a gateway, and the gateway-adaptation given 1 means that the integral controller is adapted to a gateway.

With reference to FIG. 7, the space creating part 502 then creates a new space (second space) in Step S300 by combining two or more of the spaces (first spaces) represented by the combination target room IDs of the smart home 100, on the basis of the position information 602 acquired by the acquiring part 501.

Figure 10:
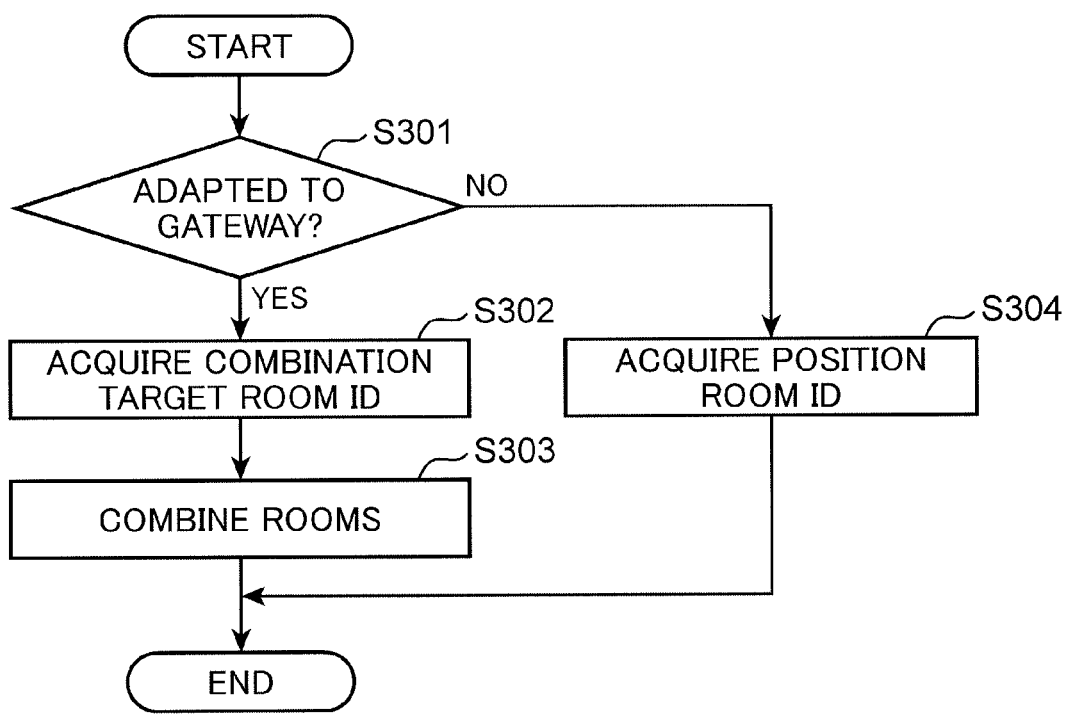
FIG. 10 is a flowchart showing an exemplary specific process of space creation.

FIG. 10 is a flowchart showing an exemplary specific process in Step S300. First, the space creating part 502 determines in Step S301 on the basis of the position information 602 whether each integral controller 200 is adapted to a gateway. The space creating part 502 determines on the basis of the position information 602 that the integral controller 200B with the setting of the gateway-adaptation given 1 is adapted to a gateway, and the integral controller 200A with the setting of the gateway-adaptation given 0 is not adapted to a gateway.

When the integral controller 200 is adapted to a gateway (YES in Step S301), the space creating part 502 then acquires in Step S302 combination target room IDs from the position information 602.

The space creating part 502 then creates in Step S303 a new space by combining rooms represented by the combination target room IDs acquired in Step S302. The integral controller 200B with the controller ID given C2 is associated with the gateway-adaptation given 1 and the combination target room ID given R1, R2, and R3. Therefore, the space creating part 502 creates a new space of LDK 150 for the integral controller 200B.

When the integral controller 200 is not adapted to a gateway (NO in Step S301), the space creating part 502 then acquires a position room ID from the position information 602 and regards the space that is represented by the position room ID as a new space. The integral controller 200A with the controller ID given C1 is associated with the gateway-adaptation given and the position room ID given R1. Therefore, the space creating part 502 regards the living room 151 as the new space for the integral controller 200A.

In Step S300, a new space is created, which is different from the rooms that have been defined in the disposition information 601. The disposition information 601 initially created by an operator of a management company or a resident includes a relevance, recorded on the basis of each room name written on an architectural drawing or each floor plan, between identification information of each room and identification information of each device 300. The new space created in Step S300 is one that has not been represented by the room names on the architectural drawing or each floor plan.

With reference to FIG. 7, the device control part 503 then assigns in Step S400 identification information (including ID and name) to the new space created in Step S300. The device control part 503 associates the identification information with identification information of two or more devices included in the new space to generate relevance information indicative of a relevance therebetween. For example, in the case that a new space of LDK 150 is created for the integral controller 200B by combining the living room 151, the dining room 152, and the kitchen 153, the device control part 503 assigns a new room ID and a new name (e.g., "LIVING-DINING-KITCHEN") to the new space. Further, the device control part 503 associates the new room ID with the device IDs (A01 to A09) of two or more devices 300 included in LDK 150 to generate relevance information.

The output part 504 then outputs in Step S500 the relevance information generated in Step S400.

With reference to FIGS. 1 and 4, the relevance information output by the output part 504 is input to the communication part 404. The communication part 404 transmits the input relevance information to the integral controller 200 through the communication network 500. The communication part 204 of the integral controller 200 receives and inputs the relevance information to the control part 201. The control part 201 creates display data on the basis of the input relevance information. The control part 201 inputs the created display data to the display part 202. The display part 202 displays a control screen on the basis of the input display data. In this regard, the notification is not limited to by the way of display, and may be by the way of sound output. The notification also includes an output of display data or sound data to a device having a display part or a sound output part.

First Embodiment

Figure 11:
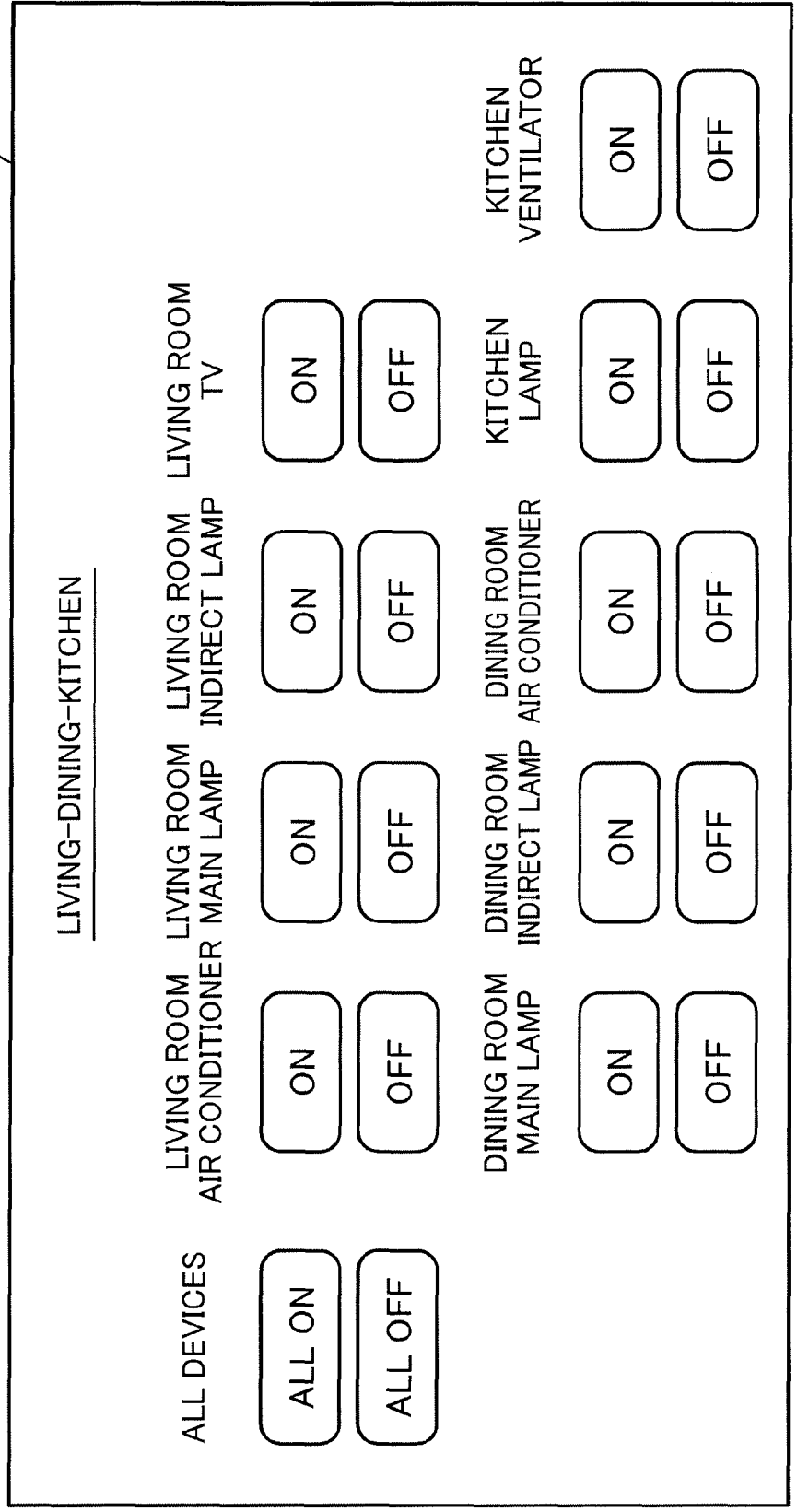
FIG. 11 is an illustration showing an exemplary control screen displayed on a display part in a first embodiment.

FIG. 11 is an illustration showing a first exemplary control screen displayed on a display part 202B of the integral controller 200B that is adapted to the gateway in the first embodiment of the present disclosure. An exemplary control screen for a new space of LDK 150 resulting from a combination of the living room 151, the dining room 152, and the kitchen 153 will be described below. In the example shown in FIG. 8, the new space of LDK 150 includes an air conditioner (device ID: A01), a main lamp (device ID: A02), an indirect lamp (device ID: A03), and a TV (device ID: A04) in the living room 151; a main lamp (device ID: A05), an indirect lamp (device ID: A06), and an air conditioner (device ID: A07) in the dining room 152; and a lamp (device ID: A08) and a ventilator (device ID: A09) in the kitchen 153.

With reference to FIG. 11, the control screen includes a text representing the name of "LIVING-DINING-KITCHEN", individual control information for individually controlling the devices 300 included in LDK 150, and collective control information for collectively controlling all of the devices 300 included in LDK 150.

The individual control information includes texts representing the name of each device 300 ("LIVING ROOM AIR CONDITIONER", "LIVING ROOM MAIN LAMP", "LIVING ROOM INDIRECT LAMP", "LIVING ROOM TV", "DINING ROOM MAIN LAMP", "DINING ROOM INDIRECT LAMP", "DINING ROOM AIR CONDITIONER", "KITCHEN LAMP", and "KITCHEN VENTILATOR") and tactile icons for switching on or off each device 300. For example, when an icon of switch-on for "DINING ROOM MAIN LAMP" is touched, the integral controller 200B switches on the main lamp disposed in the dining room 152 by remote control through the communication network; and when an icon of switch-off for "KITCHEN VENTILATOR" is touched, the integral controller 200B switches off the ventilator disposed in the kitchen 153 by remote control through the communication network.

The collective control information includes a text representing "ALL DEVICES", an icon of switch-on, and an icon of switch-off. When the icon of switch-on is touched, the integral controller 200B switches on all of the devices 300 ("LIVING ROOM AIR CONDITIONER", "LIVING ROOM MAIN LAMP", "LIVING ROOM INDIRECT LAMP", "LIVING ROOM TV", "DINING ROOM MAIN LAMP", "DINING ROOM INDIRECT LAMP", "DINING ROOM AIR CONDITIONER", "KITCHEN LAMP", and "KITCHEN VENTILATOR") included in LDK 150 by remote control through the communication network. When the icon of switch-off is touched, the integral controller 200B switches off all of the devices 300 included in LDK 150 by remote control through the communication network.

The configuration of the collective control information is not limited to one in which all of the devices 300 included in the new space are the control target, and may be one allowing the user to exclude a desired device 300 from or add it to the target by manual setting, or one allowing a specific setting for a desired device 300.

Figure 12:
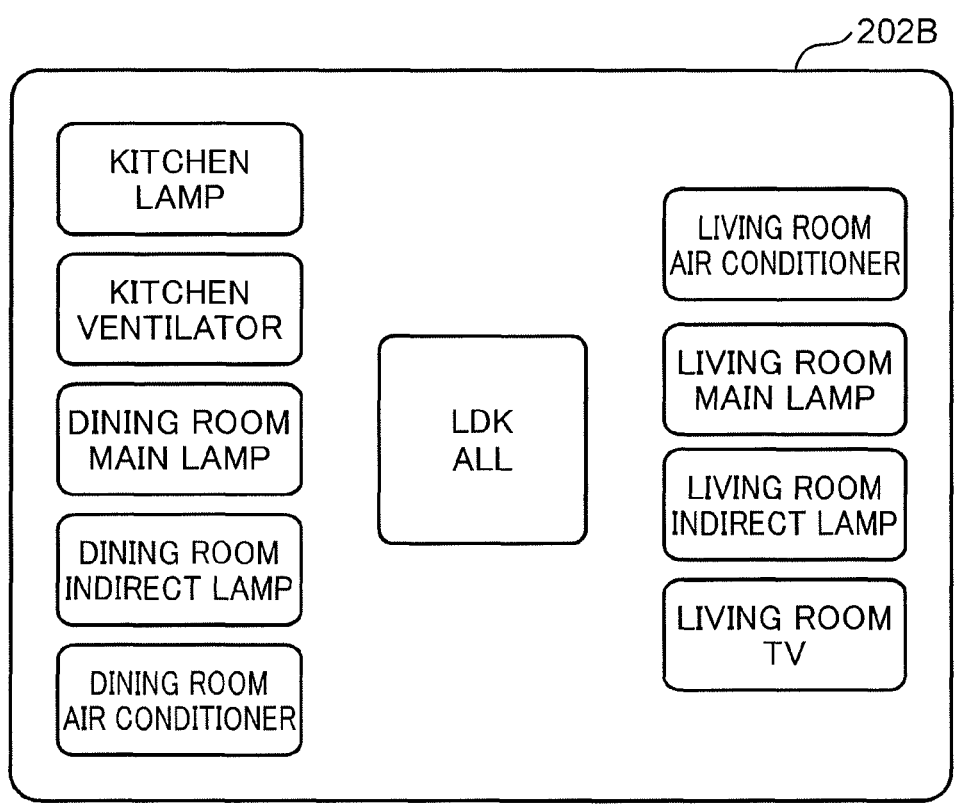
FIG. 12 is an illustration showing an exemplary control screen displayed on the display part in the first embodiment.

FIG. 12 is an illustration showing a second exemplary control screen displayed on the display part 202B of the integral controller 200B that is adapted to the gateway in the first embodiment of the present disclosure. The control screen includes collective control information including an icon implying the layout of LDK 150, and individual control information for individually controlling the respective devices 300 disposed in the living room 151, the dining room 152, and the kitchen 153.

In the collective control information, for example, when the icon representing "LDK" is touched during a time shorter than a predetermined time, the integral controller 200B switches on all of the devices 300 included in LDK 150 by remote control through the communication network; and when the icon representing "LDK" is touched during a time not shorter than the predetermined time, the integral controller 200B switches off all of the devices 300 included in LDK 150 by remote control through the communication network. As a modification, instead of controlling switch-on and switch-off on the basis of the duration of a touch under the collective control, an icon of switch-on and an icon of switch-off for the collective control may be displayed visually, though not shown in FIG. 12.

In the individual control information, for example, an icon for a device 300 that is active is bright, and an icon for a device 300 that is inactive is dark. When an icon that is bright is touched, the integral controller 200B switches off the device 300 that corresponds to the icon by remote control through the communication network. When an icon that is dark is touched, the integral controller 200B switches on the device 300 that corresponds to the icon by remote control through the communication network. As a modification, an icon of switch-on and an icon of switch-off for the individual control may be displayed for each device 300 as shown in FIG. 11, though not shown in FIG. 12.

On the control screens shown in FIGS. 11 and 12, icons for controlling the devices 300 disposed in the rooms (first spaces) are displayed overall; such way of displaying is referred to as "overall displaying".

Figure 13:
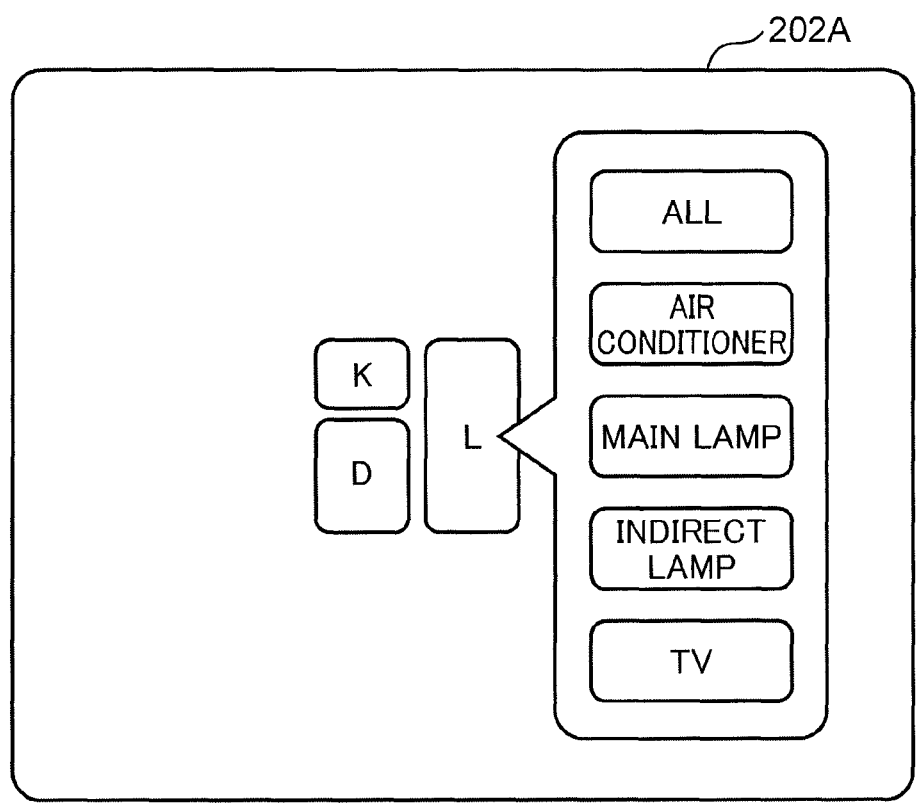
FIG. 13 is an illustration showing an exemplary control screen displayed on the display part in the first embodiment.

FIG. 13 is an illustration showing an exemplary control screen displayed on a display part 202A of the integral controller 200A that is not adapted to the gateway in the first embodiment of the present disclosure. The control screen includes icons each implying the layout of the living room 151, the dining room 152, and the kitchen 153; and the icon representing "L" has a pop-up window. The pop-up window includes individual control information for individually controlling the devices 300 disposed in the living room 151 and collective control information for collectively controlling the devices 300 disposed in the living room 151.

In the individual control information, for example, an icon for a device 300 that is active is bright, and an icon for a device 300 that is inactive is dark. When an icon that is bright is touched, the integral controller 200A switches off the device 300 that corresponds to the icon by remote control through the communication network. When an icon that is dark is touched, the integral controller 200A switches on the device 300 that corresponds to the icon by remote control through the communication network. As a modification, an icon of switch-on and an icon of switch-off for the individual control may be displayed for each device 300 as shown in FIG. 11, though not shown in FIG. 13.

In the collective control information, for example, when the icon representing "ALL" is touched during a time shorter than a predetermined time, the integral controller 200A switches on all of the devices 300 disposed in the living room 151 by remote control through the communication network; and when the icon representing "ALL" is touched during a time not shorter than the predetermined time, the integral controller 200A switches off all of the devices 300 disposed in the living room 151 by remote control through the communication network. As a modification, instead of controlling switch-on and switch-off on the basis of the duration of a touch under the collective control, an icon of switch-on and an icon of switch-off for the collective control may be displayed visually, though not shown in FIG. 13.

On the control screen shown in FIG. 13, icons for controlling the devices 300 disposed in one room (first space) are displayed; such way of displaying is referred to as "normal displaying" in distinction from "overall displaying" described above.

The integral controller 200B that is adapted to the gateway is not required to always perform the overall displaying, and may switch between the overall displaying and the normal displaying according to a predetermined switching condition.

Figure 14:
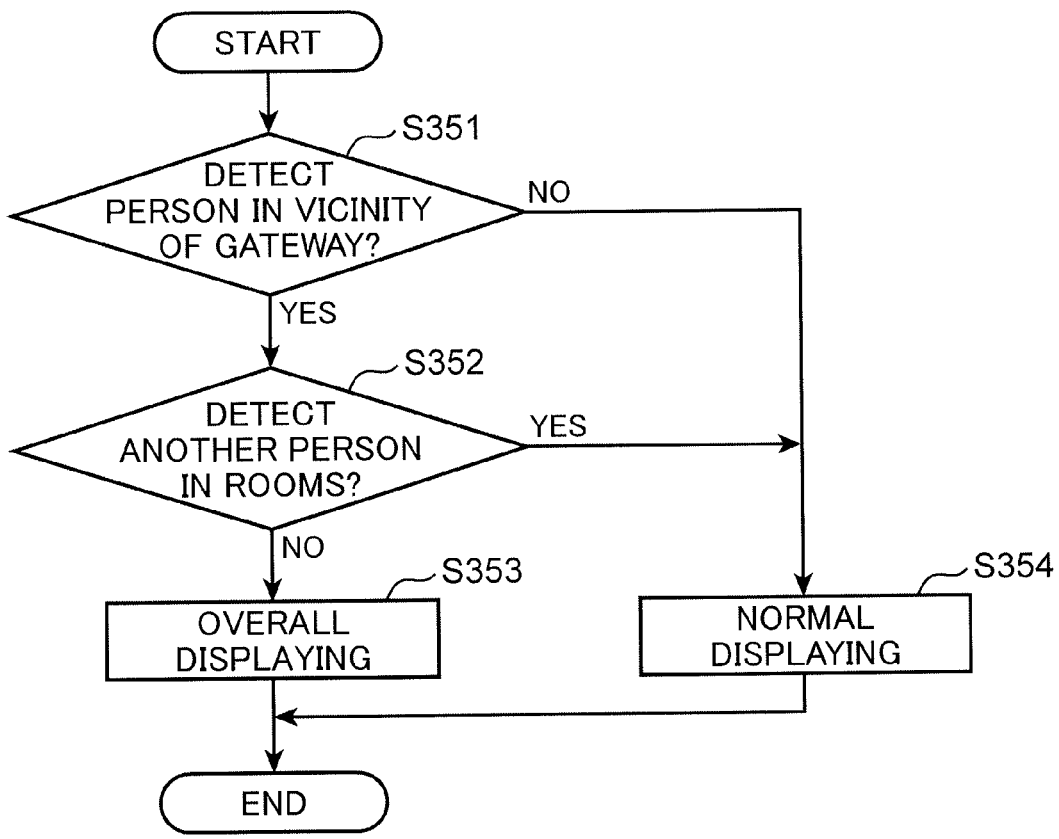
FIG. 14 is a flowchart showing a first exemplary switching condition.

FIG. 14 is a flowchart showing a first exemplary switching condition. In this example, the integral controller 200B switches between the overall displaying and the normal displaying according to whether another person other than an operating person of the integral controller 200B in LDK 150 is detected.

First, in Step S351, the device control part 503 determines whether a person has been detected in the vicinity of the gateway 162. A person in the vicinity of the gateway 162 can be detected with an unillustrated touch sensor mounted on the integral controller 200B, or with an unillustrated camera or human detection sensor by which target region of the detection is the adjacent area 190 to the gateway 162.

When a person is detected in the vicinity of the gateway 162 (YES in Step S351), the device control part 503 then determines in Step S352 whether another person has been detected in the rooms except the vicinity of the gateway 162 of the second space (LDK 150) created by the space creating part 502. Another person in the rooms except the vicinity of the gateway 162 can be detected with the camera 180 shown in FIG. 3 or with a human detection sensor, or by utterance detection or power consumption detection on LDK 150.

When another person is not detected in the rooms (NO in Step S352), the device control part 503 then performs the overall displaying in Step S353.

When a person is not detected in the vicinity of the gateway 162 (NO in Step S351) or another person is detected in the rooms (YES in Step S352), the device control part 503 then performs the normal displaying in Step S354.

Accordingly, in a case that another person other than a user is present in LDK 150, the integral controller 200B allows the user to control only the devices 300 that are included in the dining room 152 where the integral controller 200B is positioned, improving usability for a user.

Figure 15:
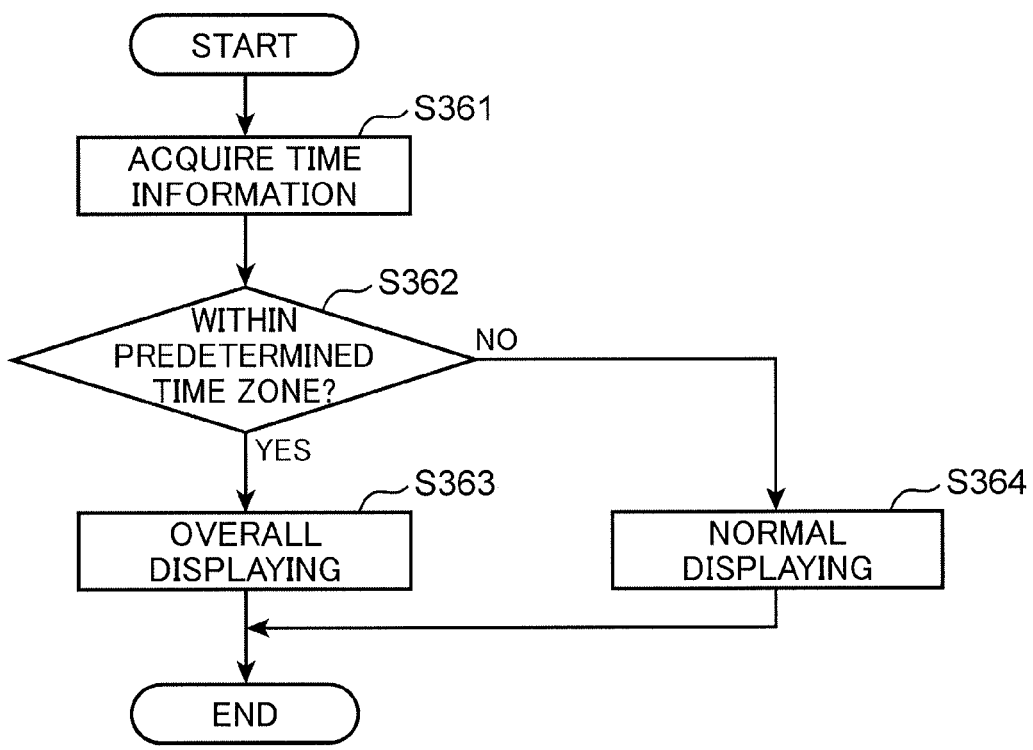
FIG. 15 is a flowchart showing a second exemplary switching condition.

FIG. 15 is a flowchart showing a second exemplary switching condition. In this example, the integral controller 200B switches between the overall displaying and the normal displaying according to whether the current time is within a predetermined time zone. A time period of which frequency of entry and leaving through the gateway 162 is higher than a predetermined threshold is set as the predetermined time zone, on the basis of, for example, record information of controls of the integral controller 200 or the devices 300. The setting information on the predetermined time zone is stored in a non-volatile memory which the device control part 503 can refer to.

First, in Step S361, the device control part 503 acquires time information indicative of the current time.

The device control part 503 then determines in Step S362 whether the current time is within the predetermined time zone.

When the current time is within the predetermined time zone (YES in Step S362), the device control part 503 then performs the overall displaying in Step S363.

When the current time is not within the predetermined time zone (NO in Step S362), the device control part 503 then performs the normal displaying in Step S364.

Accordingly, when the current time is not within the predetermined time zone, the integral controller 200B allows the user to control only the devices 300 that are included in the dining room 152 where the integral controller 200B is positioned. This improves usability for a user.

In a home control system in the embodiment, in the case that the integral controller 200 serves as an integral controller 200B that is adapted to a gateway, the display part 202B (notification part) displays collective control information for collectively controlling two or more devices 300 included in LDK 150 (second space). Accordingly, the integral controller 200B positioned in the vicinity of the gateway 162 allows a user to collectively control the two or more devices 300 included in LDK 150, improving usability for a user.

In the home control system in the embodiment, in the case that the integral controller 200 serves as an integral controller 200A that is not adapted to a gateway, the display part 202A notifies collective control information for collectively controlling two or more devices 300 included in the living room 151 (specific first space). Accordingly, the integral controller 200A positioned far away from the gateways 161 and 162 allows a user to control only the devices 300 that are included in the living room 151 where the integral controller 200A is positioned, improving usability for a user.

Second Embodiment

Figure 16:
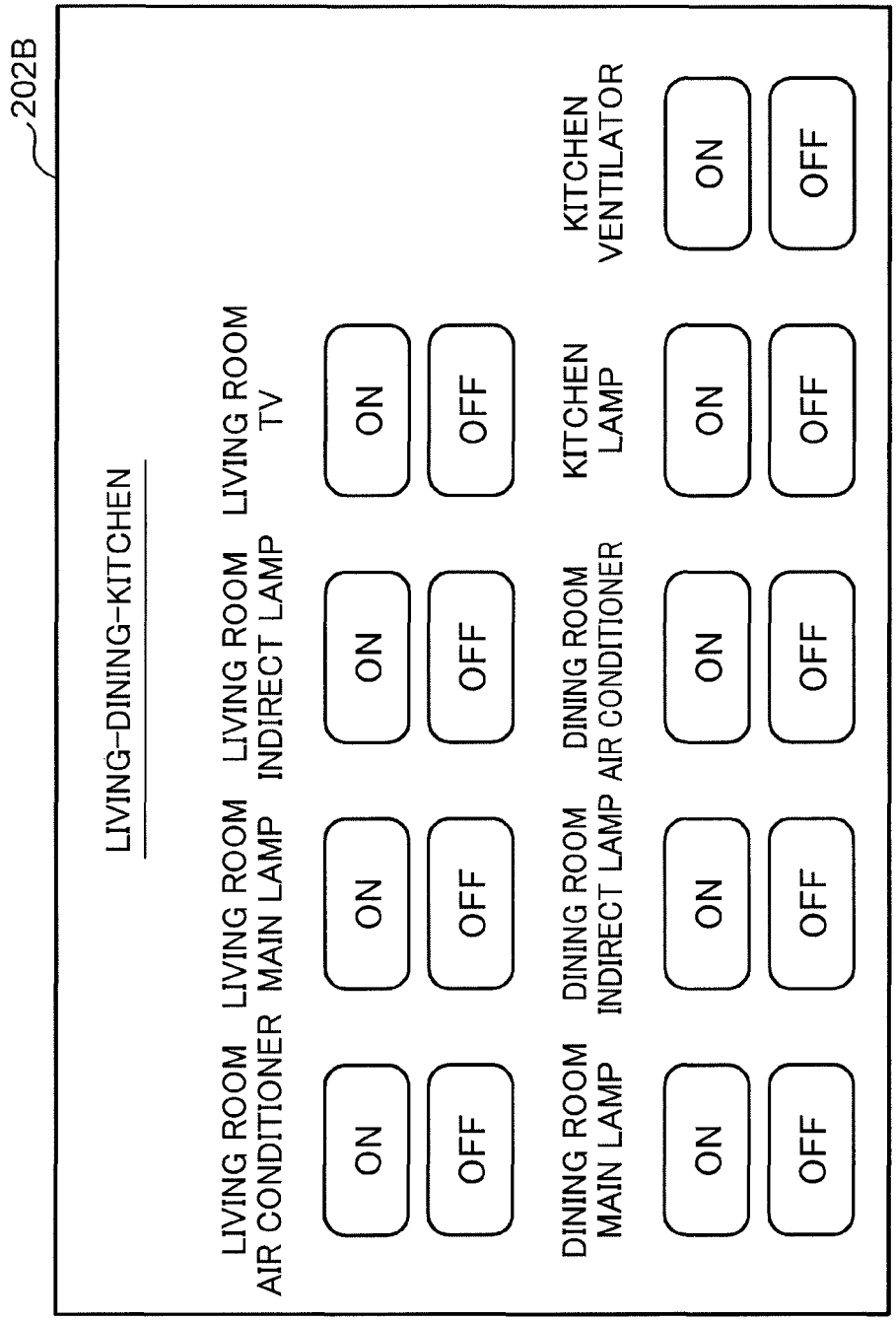
FIG. 16 is an illustration showing an exemplary control screen displayed on the display part in a second embodiment.

FIG. 16 is an illustration showing a first exemplary control screen displayed on the display part 202B of the integral controller 200B that is adapted to the gateway in the second embodiment of the present disclosure. An exemplary control screen for a new space of LDK 150 resulting from a combination of the living room 151, the dining room 152, and the kitchen 153 will be described below. In the example shown in FIG. 8, the new space of LDK 150 includes an air conditioner (device ID: A01), a main lamp (device ID: A02), an indirect lamp (device ID: A03), and a TV (device ID: A04) in the living room 151; a main lamp (device ID: A05), an indirect lamp (device ID: A06), and an air conditioner (device ID: A07) in the dining room 152; and a lamp (device ID: A08) and a ventilator (device ID: A09) in the kitchen 153.

With reference to FIG. 16, the control screen includes a text representing the name of "LIVING-DINING-KITCHEN", and individual control information for individually controlling the devices 300 included in LDK 150.

The individual control information includes texts representing the name of each device 300 ("LIVING ROOM AIR CONDITIONER", "LIVING ROOM MAIN LAMP", "LIVING ROOM INDIRECT LAMP", "LIVING ROOM TV", "DINING ROOM MAIN LAMP", "DINING ROOM INDIRECT LAMP", "DINING ROOM AIR CONDITIONER", "KITCHEN LAMP", and "KITCHEN VENTILATOR") and tactile icons for switching on or off each device 300. For example, when an icon of switch-on for "DINING ROOM MAIN LAMP" is touched, the integral controller 200B switches on the main lamp disposed in the dining room 152 by remote control through the communication network; and when an icon of switch-off for "KITCHEN VENTILATOR" is touched, the integral controller 200B switches off the ventilator disposed in the kitchen 153 by remote control through the communication network.

Figure 17:
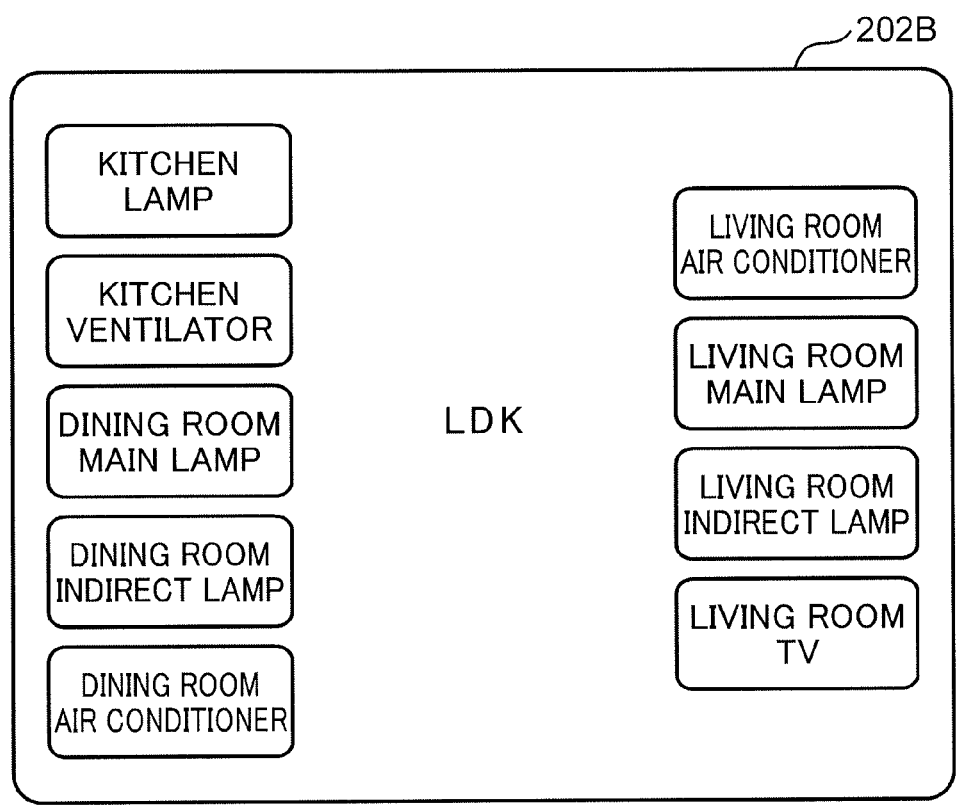
FIG. 17 is an illustration showing an exemplary control screen displayed on the display part in the second embodiment.

FIG. 17 is an illustration showing a second exemplary control screen displayed on the display part 202B of the integral controller 200B that is adapted to the gateway in the second embodiment of the present disclosure. The control screen includes a text representing the name of "LDK", and individual control information for individually controlling the respective devices 300 disposed in the living room 151, the dining room 152, and the kitchen 153.

In the individual control information, for example, an icon for a device 300 that is active is bright, and an icon for a device 300 that is inactive is dark. When an icon that is bright is touched, the integral controller 200B switches off the device 300 that corresponds to the icon by remote control through the communication network. When an icon that is dark is touched, the integral controller 200B switches on the device 300 that corresponds to the icon by remote control through the communication network. As a modification, an icon of switch-on and an icon of switch-off for the individual control may be displayed for each device 300 as shown in FIG. 16, though not shown in FIG. 17.

In a home control system in the embodiment, in the case that the integral controller 200 serves as an integral controller 200B that is adapted to a gateway, the display part 202B (notification part) displays individual control information for individually controlling two or more devices 300 included in LDK 150 (second space). Accordingly, the integral controller 200B positioned in the vicinity of the gateway 162 provides for a user overall display and individual control of the two or more devices 300 included in LDK 150, improving usability for a user.

In the home control system in the embodiment, in the case that the integral controller 200 serves as an integral controller 200A that is not adapted to a gateway, the display part 202A notifies individual control information for individually controlling two or more devices 300 included in the living room 151 (specific first space). Accordingly, the integral controller 200A positioned far away from the gateways 161 and 162 allows a user to control only the devices 300 that are included in the living room 151 where the integral controller 200A is positioned, improving usability for a user.

INDUSTRIAL APPLICABILITY

The present disclosure is useful especially when applied to a home control system for use in a smart home with IoT technology.

The invention claimed is:

1. A control device for controlling a plurality of devices disposed in a building having a plurality of first spaces, comprising:
    an acquiring part for acquiring disposition information and position information;
    a space creating part;
    a device control part; and
    a notification part, wherein
    the disposition information includes a relevance between identification information of each of the first spaces and identification information of a device disposed in each first space among the devices, and
    the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway,
    when the control device is adapted to the gateway,
    the space creating part creates a second space by combining the two or more first spaces on the basis of the position information acquired by the acquiring part,
    the device control part generates relevance information indicative of a relevance between identification information of the second space and identification information of two or more devices included in the second space among the devices, and
    the notification part notifies, on the basis of the relevance information generated by the device control part, at least one of collective control information for collectively controlling the two or more devices included in the second space and individual control information for individually controlling the two or more devices included in the second space.

2. The control device according to claim 1, wherein
    the notification part notifies the collective control information,
    when the control device is not adapted to the gateway,
    the device control part generates relevance information indicative of a relevance between identification information of the specific first space and identification information of two or more devices included in the specific first space among the devices, and
    the notification part notifies, on the basis of the relevance information generated by the device control part, collective control information for collectively controlling the two or more devices included in the specific first space.

3. The control device according to claim 1, wherein
    the notification part notifies the collective control information,
    the notification part has a display part, and
    the display part displays the identification information of the second space, identification information of each of the two or more devices included in the second space, and an icon serving as the collective control information for collectively controlling the two or more devices.

4. The control device according to claim 1, wherein
    the notification part notifies the collective control information and the individual control information.

5. The control device according to claim 1, wherein
    the notification part notifies the individual control information; and when the control device is not adapted to the gateway,
the device control part generates relevance information indicative of a relevance between identification information of the specific first space and identification information of two or more devices included in the specific first space among the devices, and
the notification part notifies, on the basis of the relevance information generated by the device control part, individual control information for individually controlling the two or more devices included in the specific first space.

6. The control device according to claim 1, wherein
the notification part notifies the individual control information,
the notification part has a display part, and
the display part displays the identification information of the second space, identification information of each of the two or more devices included in the second space, and an icon serving as the individual control information for individually controlling the two or more devices.

7. The control device according to claim 1, further comprising:
a detection part for detecting, in the second space, another person other than an operating person of the control device, wherein
when the detection part detects the another person,
the device control part generates relevance information indicative of a relevance between identification information of the specific first space and identification information of two or more devices included in the specific first space among the devices, and
the notification part notifies, on the basis of the relevance information generated by the device control part, control information for controlling the two or more devices included in the specific first space.

8. The control device according to claim 1, wherein
in a case that the current time is not within a predetermined time zone,
the device control part generates relevance information indicative of a relevance between identification information of the specific first space and identification information of two or more devices included in the specific first space among the devices, and
the notification part notifies, on the basis of the relevance information generated by the device control part, control information for controlling the two or more devices included in the specific first space.

9. The control device according to claim 1, wherein
the second space includes at least two of a living room, a dining room, and a kitchen.

10. A non-transitory computer-readable recording medium recording a program for causing a computer included in a control device for controlling a plurality of devices disposed in a building having a plurality of first spaces to serve as:
acquiring processor for acquiring disposition information and position information;
space creating processor;
device control processor; and
output processor, wherein
the disposition information includes a relevance between identification information of each of the first spaces and identification information of a device disposed in each first space among the devices, and
the position information includes a relevance between identification information of the control device, identification information of a specific first space of the first spaces where the control device is positioned, gateway-adaptation information indicative of whether the control device is adapted to a gateway, and identification information of two or more first spaces to be combined by the control device that is adapted to the gateway,
when the control device is adapted to the gateway,
the space creating processor creates a second space by combining the two or more first spaces on the basis of the position information acquired by the acquiring processor,
the device control processor generates relevance information indicative of a relevance between identification information of the second space and identification information of two or more devices included in the second space among the devices, and
the output processor outputs the relevance information to a notification part for notifying, on the basis of the relevance information generated by the device control part, at least one of collective control information for collectively controlling the two or more devices included in the second space and individual control information for individually controlling the two or more devices included in the second space.

11. A control method for controlling a plurality of devices disposed in a building having a plurality of first spaces, comprising: by a computer,
acquiring disposition information and position information;
the disposition information includes a relevance between identification information of each of the first spaces and identification information of a device disposed in each first space among the devices, and
the position information includes a relevance between identification information of a control device, identification information of a specific first space of the first spaces where the control device is positioned, gateway-adaptation information indicative of whether the control device is adapted to a gateway, and identification information of two or more first spaces to be combined by the control device that is adapted to the gateway,
when the control device is adapted to the gateway,
creating a second space by combining the two or more first spaces on the basis of the acquired position information;
generating relevance information indicative of a relevance between identification information of the second space and identification information of two or more devices included in the second space among the devices; and
outputting the relevance information to a notification part for notifying, on the basis of the relevance information generated by the device control part, at least one of collective control information for collectively controlling the two or more devices included in the second space and individual control information for individually controlling the two or more devices included in the second space.

* * * * *